United States Patent Office 3,270,076
Patented August 30, 1966

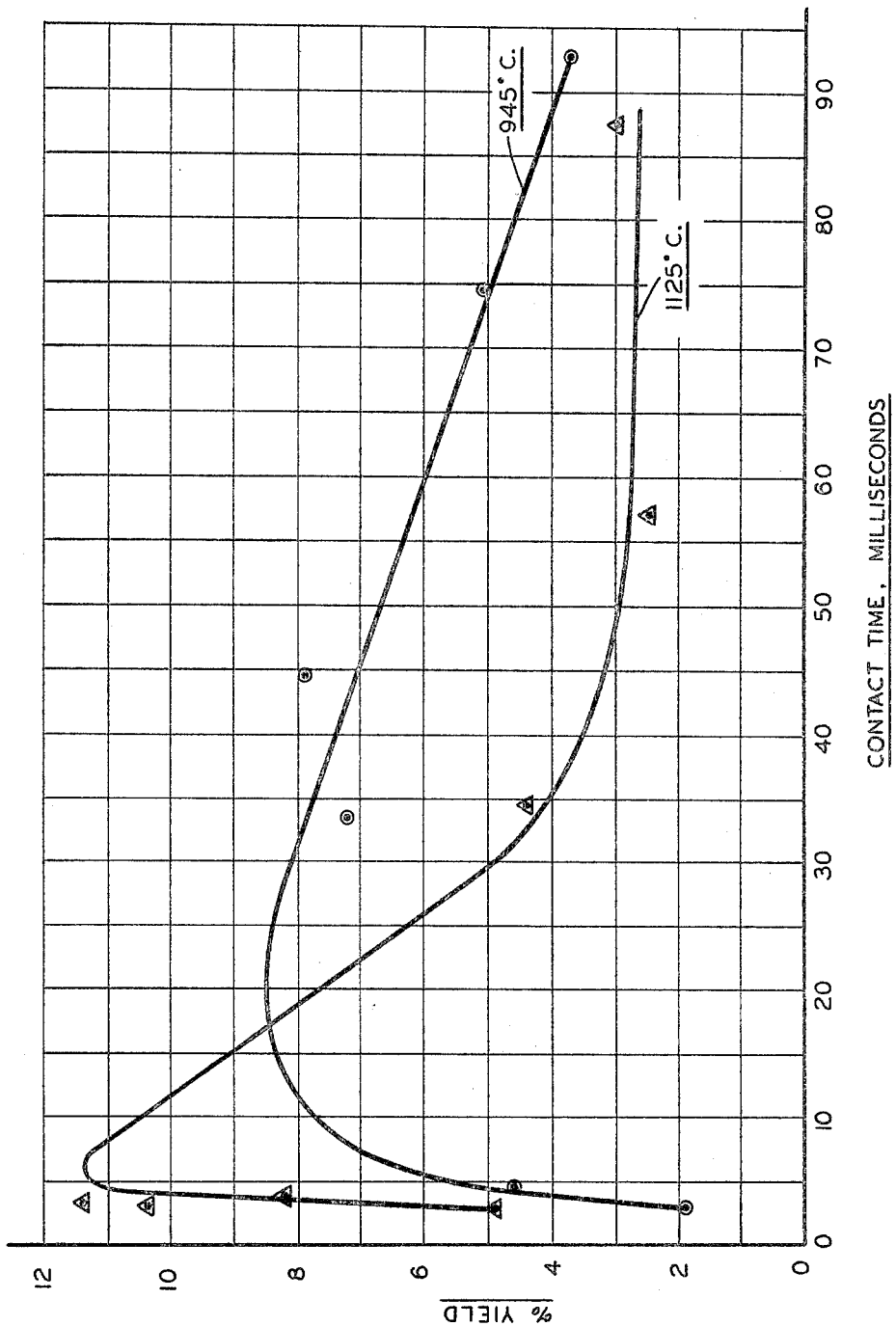

3,270,076
PROPYLENE CRACKING
John Happel, Hastings on Hudson, N.Y., and Charles J. Marsel, deceased, late of Bronx, N.Y., by Elizabeth Hug, administratrix, Yonkers, N.Y., assignors to National Lead Company, New York, N.Y., a corporation of New Jersey
Filed Oct. 28, 1965, Ser. No. 505,576
5 Claims. (Cl. 260—678)

This application is a continuation-in-part of applicants' prior application Serial No. 81,706 filed January 10, 1961 and now abandoned.

This invention relates to a novel process for the production of selected unsaturated hydrocarbons. More particularly, the invention pertains to a process for the production of acetylenic and olefinic hydrocarbons such as methyl acetylene, acetylene, allene, ethylene, and the like. Specifically, the process of this invention concerns the controlled pyrolysis of propylene to form these compounds and mixtures thereof with other valuable hydrocarbons in high conversions, selectivities, and yields. This application Serial No. 81,706, filed January 10, 1961 and entitled, "Production of Unsaturated Hydrocarbons Thereof."

It is known in the art that various hydrocarbons may be effectively subjected to cracking in order to obtain unsaturated products. For example, the pyrolysis of isobutylene has been investigated, and it was found that under controlled operating conditions significant yields of methyl acetylene and allene could be obtained with methane as the major by-product. U.S. Patent No. 2,763,703 issued to Happel and Marsel on September 18, 1956, discloses such a process.

The use of propylene in place of isobutylene involves a different chemical mechanism and a different chemical reaction. The mechanism of the reaction is quite different in that with isobutylene a methyl radical is split off, whereas with propylene a hydrogen atom is split off. Moreover, they cannot be characterized as similar chemical reactions by any of the known and accepted means of classifying a chemical reaction according to the type of alteration which a specific molecular compound undergoes.

A number of articles and patents have suggested and described the cracking of propylene to yield various products including unsaturated hydrocarbons. Both conditions of operation and results obtained have been varied and unpredictable.

Szwarc in the "Journal of Chem. Phys.," volume 17, No. 3, pages 284–291, proposed certain theoretical mechanisms for the thermal decomposition of propylene. The conditions under which Szwarc cracked propylene produced little, if any, of the theorized product, allene. A maximum reactor temperature of 872° C. and a reactor pressure of 15 mm. Hg were employed. The contact time was varied from 0.1 to 0.6 second, and the percentage decomposition, i.e. moles of propylene decomposed per moles of propylene feed, never exceeded 3.5%. While Szwarc analyzed his product samples for hydrogen and methane, he only established the qualitative presence of allene in the product.

In U.S. Patent No. 2,925,451 issued to Hogsed on February 16, 1960, a method for dehydrogenating propylene is disclosed. This method comprises passing propylene at a pressure below 100 mm. Hg over a metallic filament, e.g. platinum wire, heated to at least 900° C. at a contact time of less than 0.01 second. Allene, methyl acetylene, and ethylene were found in the condensate obtained by cooling the gaseous product with liquid nitrogen. The Hogsed process is rather limited by the fact that the process must be carried out under reduced pressures of less than 0.13 atmosphere and preferably less than 0.08 atmosphere. The patentee discloses that at pressures above 100 mm. the yields of the desired products were insignificant. It is also important to note that Hogsed in discussing the prior art methods, although not specifically identified with respect to the use of propylene, states that the dehydrogenation of propylene produces only hydrogen as a by-product and, furthermore, discourages the use of steam in conjunction with the olefinic feed. It is also of importance to note that in this reference states that prior art processes produce methane as a by-product, i.e. one mole of methane for every mole of allene or methyl acetylene produced.

Other processes have been disclosed from time to time in the art for preparation of allene and methyl acetylene by the cracking of propylene. For instance, German Patent No. 1,062,694 to E. I. du Pont de Nemours and Company discloses a high temperature process for making allene and methyl acetylene from propylene. In this process, temperatures of 800 to 1100° C. are employed, steam is used in an amount of at least 0.5 part by weight for each part of propylene, and contact times are 0.01 to 0.2 second. In four examples shown in the patent the contact times are 0.07, 0.12, 0.031, and 0.08 second. Temperatures used are in the range of 880° to 980° C. There is no information presented as to the best combination of conditions for optimum selectivities at high yield and conversions.

One object of this invention is to provide an effective process for the pyrolysis of propylene. Another object of the invention is to provide a process for the pyrolysis of propylene which avoids the operating limitations of the prior art processes. A further object of the invention is to provide a process which results in the production of other acetylenic and olefinic hydrocarbons as well as methyl acetylene and allene. Other objects will become apparent from the ensuing description of the invention.

In accordance with the present invention it has now been found that various unsaturated hydrocarbons may be produced by the thermal pyrolysis of propylene in the presence of steam. The feed mixture will, in general, contain about 6.6 to 66.0 mole percent propylene and about 34.0 to 93.4 mole percent steam, preferably about 13.0 to 35.0 mole percent propylene and about 65.0 to 87.0 mole percent steam. It is also essential and critical for good results to employ low contact times of less than about 0.01 second, preferably about 0.003 to 0.01 second. Elevated temperatures ranging from about 950° to 1200° C. are preferred. The process of this invention operates at total reactor pressures which may vary from about 200 to 800 mm. Hg. It will be understood that the use of a total pressure, i.e. propylene and steam, of about 1 atmosphere is much preferred, although subatmospheric and superatmospheric pressures may also be effectively employed to obtain the desired products. The partial pressure of the propylene in the reactor will range from about 50 to 200 mm. Hg, and preferably will be about 100 to 350 mm. Hg.

By operating under these conditions it was found that the conversion percentages of the propylene can be maintained at commercially attractive levels while obtaining outstanding yields of acetylenic and olefinic products. It was further found that the use of steam results in lower coke formation. The propylene conversion percentages can range from about 10 to 100 mole percent based on the total feed of propylene. The type of product selectively desired will to some extent govern the particular operating conditions employed. This permits a great deal of flexibility in the process and in the selectivity of the products obtained. In addition, by following the propylene cracking method as described above, it was found that not only methyl acetylene and allene were produced, but that substantial amounts of other valuable unsaturated hydrocarbons such as ethylene and acetylene could also be readily obtained. It has been found possible to optimize the yields of these products.

Although it is not intended to limit the claims by contact time to any theory, it is believed that they are critical because temperatures at which the methyl acetylene and allene are formed thermally from propylene, are also temperatures at which they themselves are pyrolyzed to other products. Thus, in order to limit the extent of this secondary pyrolysis as a side reaction the contact times must be critical by selected to obtain good selectivity of the desired products.

Further it is believed that the well established water gas reactions of steam with carbon and/or hydrocarbons operate during the course of this process. The presence served of this competing side reaction further requires that the contact times be strictly limited and selected in order to obtain the desired products.

The reaction temperatures required in the process of this invention may be attained by various methods, some of which are illustrated below:

(1) A hot gas stream such as superheated steam or an inert gas, e.g. nitrogen, is added to the propylene feed stream.

(2) The propylene-steam feed mixture is passed quickly through an electric arc zone.

(3) A portion of the propylene gas stream is burned and provides hot combustion gases which heat the gas feed stream to the desired temperature.

(4) Powdered particles of an inert material, e.g. powdered carbon and the like, are heated to elevated temperatures and injected into the propylene-steam feed stream.

It will be understood that the use of any one of the above methods is not a critical feature of this invention. It is possible, for example, to use a combination of some of these heating techniques.

In order to achieve the crtical low contact time and to keep decomposition of the reaction products and side reactions to a minimum, it is necessary to treat the reaction product gas stream immediately after it leaves the reaction zone. The recovery of unsaturated hydrocarbons prepared by the process of this invention will be assured by quickly cooling the reaction product mixture to temperatures of 350° C. or less. Shock or quick cooling of the cracked gases serves at least two purposes. It lowers the temperature of the gases below pyrolytic temperatures thereby avoiding decomposition of the products and undesirable side reactions. It also reduces the temperature of the unsaturated hydrocarbons in the product gases to a point where polymerization reactions of these materials is at a minimum. These objectives can be achieved by locating a direct water quench immediately following the reaction zone. The product gases may be passed directly into a stream or spray of cold water, oil, and the like. It is also possible to contact the reaction zone effluent gases with cool gases or with powdered, inert material such as powdered carbon, etc.

Various methods may also be employed, if separation of the valuable components of the effluent gases is desired. In general, the following separations will be involved:

(1) Carbon dioxide removal.
(2) Removal of allene, methyl acetylene, and propylene.
(3) Separation of acetylene from ethylene and lighter components.
(4) Pure acetylene recovery.

One specific method of achieving the separation involves first compressing the effluent gases to a pressure of about 150 p.s.i.g. The compressed gases are then passed through an absorption system utilizing an ammoniated carbonated solution followed by caustic scrubbing to remove all of the carbon dioxide. The resulting gas mixture is then passed through an absorber using heavy naphtha, absorption oils, refinery process liquors, and the like as an absorbing liquid. By carefully controlling the temperature and pressure in this step, the methyl acetylene, allene, propylene, butadiene and all other heavy ends are removed. In general, the temperature will range from about 15° to 90° C., while the pressures will range from about 1 to 3 atmospheres during this treatment. The effluent gas stream from the absorber will contain the hydrogen, ethylene, acetylene, and methane. Methyl acetylene and allene products of high purity as well as propylene for recycling are recovered by stripping the naphtha or other absorbent, which may then be recycled to the absorber. The propylene is separated by fractionating the $C_3$ cut and removing propylene as a bottoms product from the distillation tower. If necessary the methyl acetylene may be removed from the allene by additional fractionation.

Anhydrous ammonia is then used as a highly selective solvent extraction medium for removing acetylene from the gaseous effluent from the absorber. This operation is conducted at low temperature levels ranging from about −30° to −60° C., preferably about −38° to −45° C., and at pressures below 150 p.s.i.g. Any ethylene absorbed by the ammonia is removed in an ethylene absorber and is recycled to the acetylene absorber. The acetylene-ammonia mixtures so obtained are then passed to an acetylene stripper, where the resulting gaseous mixture of acetylene and ammonia is washed with water to remove the ammonia. The latter may then be recycled to the previous step wherein the acetylene is removed from the effluent gas stream.

The remaining mixture containing ethylene, methane and hydrogen is then easily separated into pure cuts because of their different boiling points. For example, a pure ethylene product can be recovered by pressure distillation, and the resulting mixture of methane and hydrogen could be recycled for use as burner gas fuel.

It will be understood that the above method of separation and the operating conditions set forth are intended only as illustrative of many other methods using conventional technique which may be employed for recovering the valuable products and by-products of this invention.

The hydrocarbon olefinic feed used in the process may be substantially pure propylene or a mixture obtained from refinery gas or a pipeline hydrocarbon stream containing substantial amounts of propylene. The latter type of feed has decided economic advantages where such propylene-containing mixtures are commercially available from distillation, extraction, and similar operations. It will also be understood that the process may be efficiently carried out in a pyrolysis tube or in a series of coils or tubes made of stainless steel, ceramic material or the like. In general it is preferred to meter the propylene feed stream prior to its introduction into the reaction zone.

As previously mentioned, the process herein described has flexibility with respect to the selectivity of the products obtained. For example, at any given temperature within the operable range longer contact times yield less ethylene and more acetylene, less butene-1 and more butadiene, as well as less allene and more methyl acetylene. By varying the temperature and keeping the contact time constant, the product distribution may also be changed. There will be, for example, more acetylene produced at 1200° C. than at 1000° C., if the contact time and reactor pressure are kept constant. The amount of butene-1, trans-butene-2, and butadiene will also be reduced at higher temperatures. The ability to control the product distribution is another important feature of this invention, which can be used to produce at maximum selectivities or at economical conversion percentages mixtures of methyl acetylene and allene as well as other valuable by-products such as acetylene, ethylene, and butadiene in varying quantities and ratios. The formation of methyl acetylene and allene is of particular importance, since in the past these compounds have been difficult and expensive to prepare. The methyl acetylene and allene are useful as fuels, as chemical intermediates for polymers, as coatings, and for other applications where their high order of reactivity is valuable.

The invention will be more fully understood by reference to the following illustrative example, although it is in no way intended to limit the invention thereto.

EXAMPE I

In Run A the pyrolysis reactor used was a stainless steel cracking tube operated at atmospheric pressure. Propylene being controlled to about 100 mm. Hg, with superheated steam injected into the feed for dilution. The mole ratio of propylene to steam in the feed was about 1 to 6.6. A contact time of about 0.003 second and a reaction temperature of about 1100° C. were employed. The hot effluent gases were quenched with water immediately after leaving the reaction zone. A propylene conversion of about 20% is shown in Table 1, Run A and the analysis of the recovered effluent gases of Run A is set forth below in Table 2.

The operating conditions and yields of several similar runs, B and C, utilizing propylene partial pressures of about 200 mm. Hg are also set forth below in Tables 1 and 2.

*Table 1*

| Run No. | A | B | C |
|---|---|---|---|
| Reaction Tube I.D., inch | 0.25 | 0.674 | 0.674 |
| Propylene Fed, moles/hr | 0.00413 | 0.163 | 0.127 |
| Steam Fed, moles/hr | 0.02725 | 0.468 | 0.357 |
| Steam/Propylene Feed Ratio | 6.6 | 2.80 | 2.80 |
| Temperature, ° C | 1110 | 960 | 975 |
| Pressure, mm. Hg: | | | |
| Propylene | 100 | 200 | 200 |
| Total Reactor, atmosphere | 1 | 1 | 1 |
| Contact Time, milliseconds | 3.0 | 4.6 | 5.6 |
| Selectivity, percent | 25.4 | 22.13 | 19.95 |
| Conversion, percent | 20 | 30.83 | 36.97 |

*Table 2*

| Product Analysis, Percent | A | B | C |
|---|---|---|---|
| Methane | 7.23 | 10.95 | 13.02 |
| Ethane | | 0.33 | 0.27 |
| Ethylene | 6.56 | 7.90 | 10.37 |
| Propane | 0.49 | 0.96 | 0.75 |
| Propylene | 69.85 | 55.54 | 48.20 |
| Acetylene | 1.17 | 4.94 | 6.66 |
| Allene | 2.51 | 2.44 | 2.30 |
| Butene-1 | 0.63 | 0.45 | 0.40 |
| Methyl Acetylene | 1.98 | 3.04 | 3.34 |
| Butadiene | 0.35 | 0.40 | 0.59 |
| Hydrogen | 8.96 | 12.88 | 12.30 |
| Carbon Dioxide | 0.05 | 0.10 | 1.65 |
| Trans-butene-2 | 0.14 | | 0.08 |
| Cis-butene-2 | 0.09 | | 0.08 |

The above data show that the cracking of propylene by the process of this invention leads to outstanding yields of methyl acetylene, allene, and various other valuable unsaturated hydrocarbons. Moreover, the data indicates that the present process does not require extreme reduced pressure conditions or even a partial vacuum of less than 100 mm. Hg in order to obtain an effective pyrolysis reaction of propylene with significant yields of the desired products.

EXAMPLE 2

Another series of runs was carried out cracking propylene. The apparatus employed was similar to that used in the experiments of Example 1. The heat necessary to achieve the selected cracking temperatures is supplied by a hydrogen-oxygen flame. This also supplies some of the diluent steam, since the product of combustion is water. The temperature of the reaction is taken at the entrance of the cracking zone which is located just below the propylene inlet and is recorded by means of a potentiometric recorder. Whenever additional steam, if any, is required, it is metered by means of a rotometer. In a similar manner, the hydrogen, oxygen and propylene are metered by rotometers.

The reaction mixture is quenched immediately upon leaving the cracking zone by means of water sprays. The product gases then flow to a separator where additional cooling takes place and the steam is condensed and removed from the product gases. The gases then go to an entrainment separator and are then metered.

The oxygen and hydrogen used in the experiments were commercial grade better than 99.5% pure. The propylene feed was at least 97% propylene.

Product analysis was achieved by a combination of chromatographic and mass spectrographic means, ethane, ethylene, carbon dioxide, propane, propylene, acetylene, butane, butenes, butadiene, methyl acetylene, and allene were determined chromatographically, while hydrogen, oxygen, nitrogen, methane, carbon monoxide, and propylene were determined by the mass spectrometer.

For the purposes of the data in the Table 3 shown below, conversion is defined as the moles of propylene reacted per moles of propylene fed, selectivity is defined as the moles of methyl acetylene plus allene produced per mole of propylene reacted, and yield is the moles of methyl acetylene plus allene produced per mole of propylene fed. Thus, the yield is the product of selectivity and conversion.

Specifically, the propylene cracking runs were made at atmospheric pressure at 945° C. and 1125° C. at contact times between 3 and 100 milliseconds with propylene partial pressures maintained between 90 and 200 mm. Hg by means of steam dilution. The results are presented in Table 3 and plotted in the accompanying figure. In this figure, there is a very well defined critical region for cracking at 1125° C. in the range 10 millisecond range. For a temperature of 945° C. the critical area is more diffuse, with the slope increasing below 10 milliseconds and decreasing over 20 milliseconds.

In all the prior art in which the cracking of propylene is described, it is especially notable that the contact times which have been used are much longer than those found to be critical for the good results of this invention.

In the process of the invention, it is clear that the yield per pass to methyl acetylene plus allene rises rapid-

*Table 3*

| Temperature, ° C | 945 | | | | | | 1,125 | | | | | |
|---|---|---|---|---|---|---|---|---|---|---|---|---|
| Contact time, Millisec | 3.02 | 4.55 | 33.3 | 44.5 | 74.7 | 93 | 3.2 | 3.3 | 3.8 | 29.3 | 34.4 | 87.5 |
| Selectivity, percent | 19.94 | 10.24 | 15.59 | 20.26 | 17.45 | 8.1 | 17.8 | 13.95 | 10.2 | 4.98 | 4.52 | 3.03 |
| Conversion, percent | 9.42 | 51.05 | 46.02 | 38.92 | 29.2 | 45.4 | 63.9 | 74.0 | 79.7 | 88.2 | 97.2 | 99.0 |
| Steam, percent | 78.7 | 74.7 | 81.1 | 79.4 | 88.2 | 73.9 | 88.3 | 79.4 | 88.3 | 86.4 | 88.2 | 89.1 |
| Yield, percent | 1.87 | 5.23 | 7.17 | 7.88 | 5.09 | 3.66 | 11.4 | 10.3 | 8.2 | 4.4 | 4.4 | 2.9 |
| P.P. propylene, mm. Hg | 171.4 | 199.8 | 144.0 | 156.95 | 90.4 | 194.97 | 81.8 | 90.3 | 87.57 | 104 | 86.96 | 83.1 | ly when the contact time is below 0.01 second.

While particular embodiments of this invention are shown above, it will be understood that the invention is obviously subject to modifications without departing from its broader aspects. For example, methods other than those referred to above may be employed to achieve the required reaction temperatures and other known separation procedures may be employed to recover the valuable products and by-products.

What is claimed is:

1. The process which consists of cracking a mixture of propylene and more than 34.0 mole percent of steam and having at least 100 mm. Hg partial pressure of propylene, at a temperature between 900° and 1200° C. at contact times less than 0.01 second, and at least 1 atmosphere total pressure, shock quenching the resulting gaseous mixture, and separating and recovering unsaturated hydrocarbons including methyl acetylene and allene, therefrom.

2. The process of claim 1 in which the mole ratio of steam to propylene is from 6.6 to 2.8.

3. The process of claim 1 in which the temperature is between 945° and 1125° C.

4. The process of claim 1 in which the contact time is between 0.003 to 0.01 second.

5. The process for preparation of methyl acetylene and allene, which consists of subjecting a mixture of propylene and at least 54.0 mole percent steam to a temperature of about 945° to 1125° C. at a pressure of about 1 atmosphere and contact time of 0.003 to 0.01 second, and recovering unsaturated hydrocarbons therefrom.

References Cited by the Examiner
UNITED STATES PATENTS

| | | | |
|---|---|---|---|
| 2,912,475 | 11/1959 | Kraus et al. | 260—679 |
| 2,925,451 | 2/1960 | Hogsed | 260—678 |
| 2,973,395 | 2/1961 | Keith et al. | 260—678 |
| 3,082,273 | 3/1963 | Peer et al. | 260—678 |
| 3,198,848 | 8/1965 | Happel et al. | 260—678 |

ALPHONSO D. SULLIVAN, *Primary Examiner.*